United States Patent
Porter

(10) Patent No.: US 7,430,209 B2
(45) Date of Patent: Sep. 30, 2008

(54) METHOD AND APPARATUS FOR PROVIDING COMMUNICATIONS BANDWIDTH TO USERS HAVING A COMMITTED DATA RATE BASED ON PRIORITY ASSIGNMENT

(75) Inventor: John David Porter, Cambridge (GB)

(73) Assignee: Cambridge Broadband Limited, Cambridge (GB)

( * ) Notice: Subject to any disclaimer, the term of this patent is extended or adjusted under 35 U.S.C. 154(b) by 681 days.

(21) Appl. No.: 10/481,847

(22) PCT Filed: Jun. 26, 2002

(86) PCT No.: PCT/GB02/02910

§ 371 (c)(1),
(2), (4) Date: Jun. 7, 2004

(87) PCT Pub. No.: WO03/003671

PCT Pub. Date: Jan. 9, 2003

(65) Prior Publication Data

US 2004/0213259 A1 Oct. 28, 2004

(30) Foreign Application Priority Data

Jun. 27, 2001 (GB) ................................. 0115676.9

(51) Int. Cl.
*H04L 12/28* (2006.01)
(52) U.S. Cl. .................... 370/395.4; 370/412
(58) Field of Classification Search .............. 370/395.4, 370/230, 232, 412
See application file for complete search history.

(56) References Cited

U.S. PATENT DOCUMENTS

| | | | | |
|---|---|---|---|---|
| 5,339,332 A | * | 8/1994 | Kammerl | 375/225 |
| 5,343,465 A | * | 8/1994 | Khalil | 370/232 |
| 5,793,747 A | * | 8/1998 | Kline | 370/230 |
| 6,097,698 A | * | 8/2000 | Yang et al. | 370/231 |
| 6,122,291 A | | 9/2000 | Robinson et al. | |
| 6,188,698 B1 | * | 2/2001 | Galand et al. | 370/412 |
| 6,765,873 B1 | * | 7/2004 | Fichou et al. | 370/235 |
| 6,810,012 B1 | * | 10/2004 | Yin et al. | 370/230.1 |
| 6,904,015 B1 | * | 6/2005 | Chen et al. | 370/235 |
| 7,046,665 B1 | * | 5/2006 | Walrand et al. | 370/392 |

FOREIGN PATENT DOCUMENTS

EP 1130877 A2 9/2001
WO WO 97/35410 9/1997

(Continued)

*Primary Examiner*—Hassan Kizou
*Assistant Examiner*—Jeffrey M Rutkowski
(74) *Attorney, Agent, or Firm*—Fish & Richardson P.C.

(57) ABSTRACT

A communications system operator provides to each user of a multi-user communications system a committed information rate (CIR). When a user requests bandwidth for transmission, a system controller queues the user in a high-priority subclass A. The system controller allocates bandwidth to the user at the head of the queue as requested but if the user's bandwidth, measured as an average over a sampling time, exceeds its CIR, it is moved into a low-priority subclass B. The user can then only obtain further bandwidth after other users in the high-priority subclass have been allocated bandwidth up to their CIRs. If a user in the low-priority subclass only receives allocation of a small amount of bandwidth, so that its average inforamtion rate falls below its CIR, it is moved back in to the queue in the high-priority subclass.

16 Claims, 6 Drawing Sheets

FOREIGN PATENT DOCUMENTS

| | | |
|---|---|---|
| WO | WO 99/57925 | 11/1999 |
| WO | WO 00/35152 | 6/2000 |
| WO | WO 00/41368 | 7/2000 |
| WO | WO 00/56023 | 9/2000 |
| WO | WO 01/24428 | 4/2001 |
| WO | WO 01/60105 | 8/2001 |

\* cited by examiner

PRIORITY CLASS 1

50    52

PRIORITY CLASS 2

50    52

METHOD AND APPARATUS FOR PROVIDING COMMUNICATIONS BANDWIDTH TO USERS HAVING A COMMITTED DATA RATE BASED ON PRIORITY ASSIGNMENT

This invention relates to a method and apparatus for providing communications bandwidth and, in particular, to the provision of bandwidth to users in a multi-user telecommunications system such as a fixed wireless access (FWA) system.

In many telecommunications systems, such as FWA, mobile telephone or cable systems, available bandwidth is shared between a number of users. In such systems users typically purchase bandwidth and a system operator will aim to sell as much bandwidth as possible. Often, the amount of bandwidth sold may exceed the total bandwidth available. For example, an operator of a cable network offering internet access may expect that at any particular time, on average, a proportion of users will not be seeking access to bandwidth and that even when a user is connected to the internet their bandwidth requirement will be intermittent. Therefore, the operator can increase revenue by selling to users an aggregate bandwidth greater than the total available bandwidth and expect that, most of the time, no problem of excess demand will arise.

As the amount of bandwidth sold increases, the likelihood arises that, at times, the aggregate bandwidth sought by users will exceed the total available. Under these circumstances, all users clearly cannot have the bandwidth which they request and, depending on the business model used by the system operator, the bandwidth which they may have paid for. It is important for the system operator to ensure that all users have satisfactory access to bandwidth; different users may purchase different amounts of bandwidth, for example, but the system operator needs to provide adequate access to all users who have purchased bandwidth, or risk losing their custom. Thus, problems arise in allocating bandwidth to users and prioritising each user's access to bandwidth, particularly during overload conditions.

SUMMARY OF INVENTION

The invention provides a method, a communications system and a communications system controller as defined in the appended independent claims, to which reference should now be made. Preferred or advantageous features of the invention are set out in dependent sub-claims.

In this document, the term user is used to correspond to a single communications channel. In an ATM system, therefore, each user corresponds to a virtual circuit or channel.

In a first aspect, the invention allows users to obtain a limited amount of bandwidth, termed a committed data rate, with high priority access and to obtain extra bandwidth if it is available, for example when demand from other users is low.

Advantageously, a system operator may agree a committed data rate with each user. The committed rate may vary between users and may reflect the purchase price paid by each user to the system operator.

In this aspect of the invention, for the purpose of providing bandwidth within each service interval of the communications system to users, users seeking bandwidth are classified into either a high priority subclass or a low priority subclass. The available bandwidth is then provided first to users queued in the high priority subclass. When a user initially successfully requests a communications channel, that user is placed in the high priority subclass and receives the amount of bandwidth it is requesting when its turn comes in the schedule. Depending on the operation of the system, a channel may be requested using, for example, a contention procedure or a polling procedure. If, however, the user transmits a sufficiently large amount of data that it exceeds its committed data rate, then it is moved into the low priority subclass. Further bandwidth can still be provided to that user but only after users in the high priority subclass have received their allocation. Thus, when the user is in the low priority subclass it may be able to obtain more bandwidth, particularly at times of low demand from other users.

If a user in the low priority subclass requests or is provided with bandwidth at a low rate such that its average data rate over a sampling period falls below its committed data rate, then it is moved back into the high priority subclass. Thus, a system operator can provide committed data rates to users such that, at times of normal demand, each-user may expect to achieve a rate comparable to its committed rate but cannot block access to other users by exceeding its committed rate.

Each user's actual data rate is preferably measured as an average over a sampling period which is much longer than the service interval. This enables a user to transmit data in short bursts of higher bandwidth without exceeding its committed data rate unless the higher rate is sustained for too long. This advantageously allows users to achieve high data rates and reduces system overheads, which increase if users can only send small amounts of data at a time because of the increased frequency of switching between users.

In a preferred aspect of the invention, each user also arranges a peak data rate or peak information rate (PIR) with the system operator. The purpose of implementing peak rates is primarily to prevent a user from blocking the transmissions of other users, particularly in the low priority. The peak rate may be controlled in various ways, which may advantageously be selected by the system operator to ensure satisfactory system performance and to offer commercially attractive services to subscribers. For example, a user's bandwidth may be limited to a predetermined, usually fixed, PIR by a capping mechanism, typically applied at the ingress point of the user's communications into the network. In such a case a user's PIR may be fixed by agreement with the system operator and the user can never transmit and/or receive (depending on the agreement) at a higher rate. Agreed uplink and downlink peak rates may, in principle, differ. In a preferred embodiment the medium access control (MAC) which actively controls users' transmissions with reference to their committed information rates (CIR) as described above need not consider the users' peak rates, which are capped upstream of the MAC.

In an alternative example, users' PIRs may be controlled by the MAC. This increases the processing required of the MAC but may advantageously allow more flexible, active control of PIRs. For example a user's PIR may be varied in response to overall user demand for bandwidth at any time. In a further embodiment of such an actively-controlled system, if a user's average rate over a sampling period exceeds its peak rate, it may be prevented from making further transmissions and have to make a new request for further bandwidth.

In a particularly preferred aspect of the invention, users are further classified into two or more priority classes. Within each priority class a high and a low priority subclass are operated as described above. However, during the provision of bandwidth, all users in the highest priority class take precedence over all users in the next priority class, and so on. This provides a mechanism for, for example, prioritising certain types of communications channel over others. In a preferred embodiment, voice channels may be placed in the highest priority class and data channels in a lower priority class. This ensures that voice channels, which cannot tolerate interruptions, are allocated bandwidth in each service interval with the highest priority.

It will be appreciated that limiting the PIR of a user in the low priority subclass of, for example, the highest priority class, advantageously prevents that user from blocking users in lower priority classes from accessing bandwidth. This may be achieved as described above either using an automatic, passive PIR capping procedure or an active procedure controlled by the MAC.

As noted above, in this document each user corresponds to one communications channel. A subscriber to a data transmission system may, however, wish to transmit data of more than one type at the same time. For example, they may request a voice channel and a data channel at the same time. A corporate subscriber might request a number of voice channels and a number of data channels at the same time. To accommodate such requirements, a system operator might sell to a subscriber a package comprising a number of committed data rates for a number of users. Thus, a corporate subscriber might purchase 50 committed data rates for voice channels (or users) and 50 larger committed data rates suitable for data channels (or users).

SPECIFIC EMBODIMENTS AND BEST MODE OF THE INVENTION

Embodiments of the invention will now be described by way of example, with reference to the drawings, in which.

A first embodiment of the invention manages bandwidth access in a fixed wireless access (FWA) system in which a system operator serves a number of users from a base transceiver station. Each user can send and receive data over the FWA link and purchases bandwidth in advance from the system operator. Each user purchases a predetermined level of service giving a committed data rate and a peak data rate. Different users may advantageously purchase different levels of service.

Figure 1A:
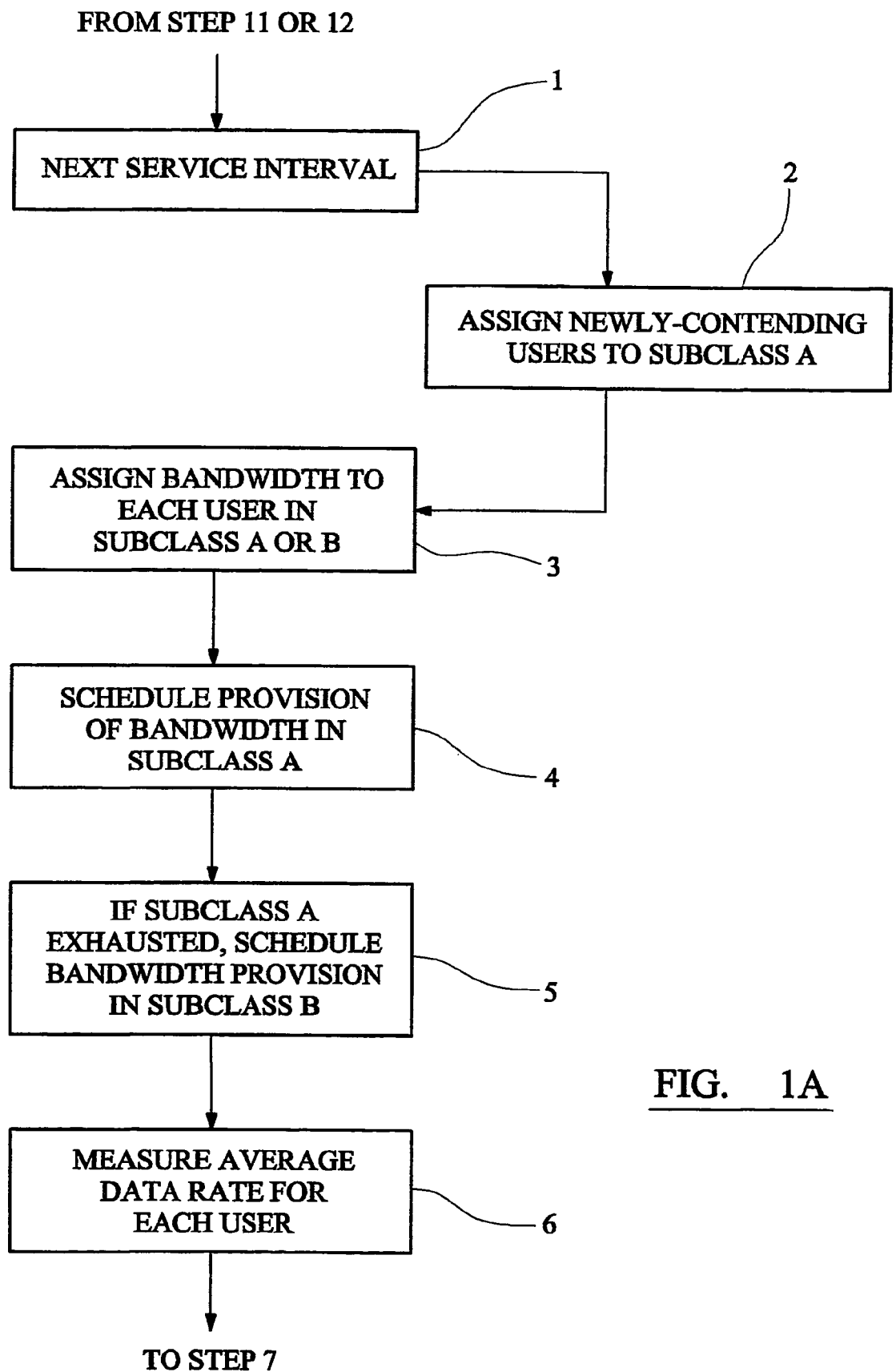
FIG. 1 is a flow diagram illustrating a method according to a first embodiment of the invention.

The FWA system of the embodiment is a framed ATM (asynchronous transfer mode) system and provides a communications link divided into a series of service intervals. The length of each service interval is advantageously related to the framing interval. The following bandwidth provision procedure is repeated in each service interval (step 1), as illustrated in FIG. 1.

Figure 2:
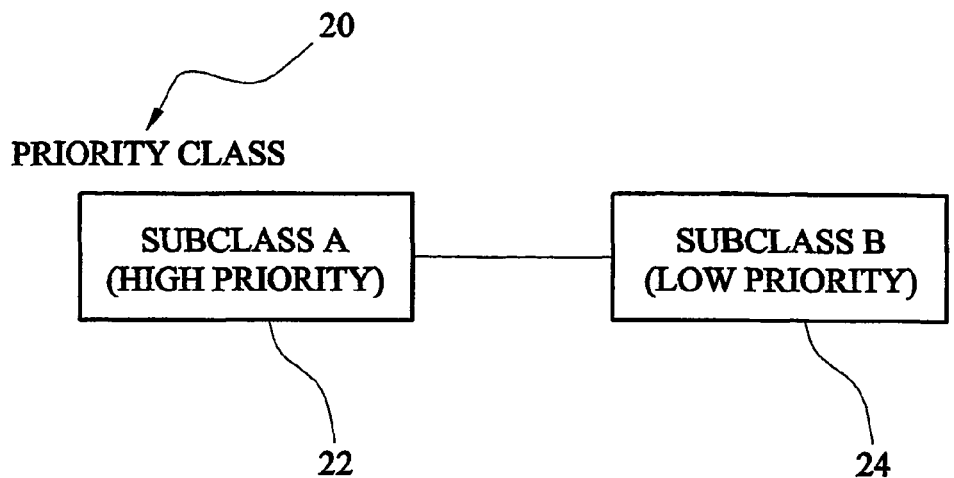
FIG. 2 is a block diagram showing the subclass structure of the first embodiment.

All users which are seeking bandwidth are contained in one of two subclasses within a single transmission priority class. As shown in FIG. 2, the priority class 20 contains a high-priority subclass 22, termed subclass A, and a low-priority subclass 24, termed subclass B.

When a user wishes to transmit data, it sends a contention request to a system controller located at the base station. If the request is granted, the user is granted a virtual channel on the ATM system and is placed in subclass A (step 2), at the end of a queue of users if there are already other users in subclass A.

Each user in subclass A or B is then allocated an amount of bandwidth for transmission in their channel in the current service interval (step 3), which corresponds to the amount of data they are currently seeking to transmit. In the ATM system of the embodiment, an allocation may be a number of ATM cells. In an alternative implementation, the bandwidth allocated to each user in each service interval is limited to a predetermined maximum. In the embodiment, this would be a maximum number of ATM cells in a given period.

The users queued in subclass A are then given access to their allocated bandwidth in turn, using a round robin scheduling procedure (step 4), until either all users in subclass A have received their bandwidth or the bandwidth available in the service interval is exhausted. If there is bandwidth available in the service interval after bandwidth has been provided to all the users in subclass A, users queued in subclass B are given their bandwidth in turn, again using a round robin scheduling procedure (step 5), until either all users in subclass B have received their bandwidth or the bandwidth available in the service interval is exhausted.

The system controller then measures the average bandwidth used by each user over a predetermined sampling interval, for example using a leaky-bucket monitoring technique, or other suitable method. The sampling interval is preferably much longer than the service interval. For example, in the embodiment the service interval may be about 1 ms and the sampling interval about 50 ms or 100 ms. In each service interval, the system controller updates the measurement of each user's average bandwidth over the most recent sampling interval (step 6).

The system controller then compares the measured average bandwidth for each user in subclass A with the committed rate they have purchased (step 7), and if the average rate exceeds the committed rate, then the system controller moves that user to the end of the queue in subclass B (step 8).

Finally, the system controller compares the average rate for each user in subclass B with that user's committed rate (step 11) and, if the user has an average rate less than its committed rate, moves that user to the end of the queue in subclass A (step 12).

This completes the bandwidth provision procedure for the current service interval, so control of the procedure repeats for the next service interval, starting at step 1.

In this first embodiment, each user is assigned a peak information rate (PIR) which is applied as an automatic cap at the ingress point to the network before control of the user's bandwidth is passed to the system controller.

The system operator will typically limit the aggregate of the PIRs provided to users to ensure that the system is never, or is sufficiently rarely, overloaded.

Figure 1B:
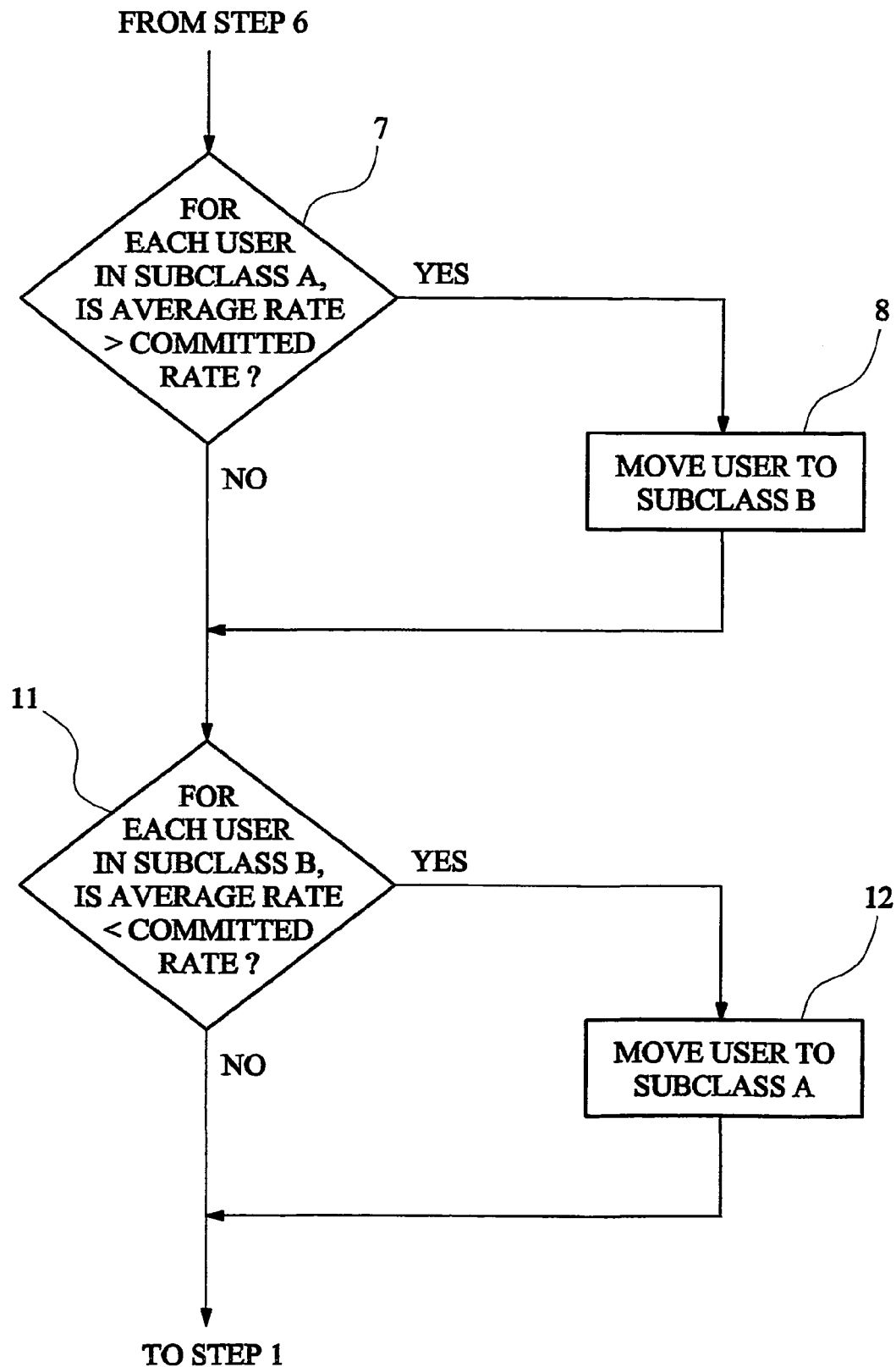

In a variation of this embodiment, in which the system controller (MAC) actively controls users' PIRs, the following steps are implemented, for example between steps 7 and 11 in FIG. 1B. The system controller compares the average bandwidth for each user in subclass B with the peak rate purchased by the user. If a user's average rate exceeds its peak rate, then the system controller moves that user out of subclass B, and that user needs to contend for bandwidth again if it requires access to further bandwidth.

Figure 3:
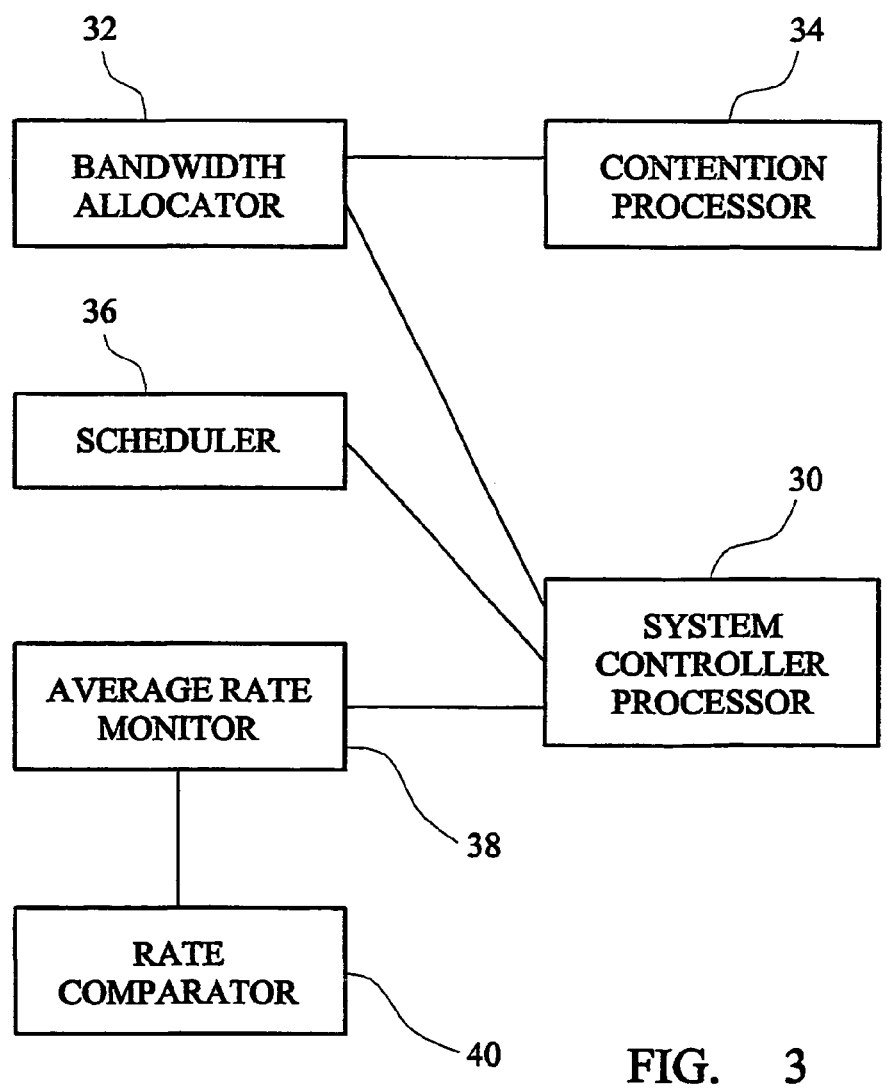
FIG. 3 is a block diagram of a system controller according to the first embodiment or a second embodiment.

FIG. 3 is a block diagram of a system controller for carrying out the method of the first embodiment. A controller processor 30 controls the sequence of events performed in each service interval, and is coupled to an allocator 32 which allocates bandwidth as described above to users in the subclasses A and B after a contention processor 34 has added any new users to subclass A. A round robin scheduler 36 then provides their requested bandwidth to the users, first in subclass A and then, if further bandwidth is available, in subclass B. Finally, the controller processor causes an average rate monitor 38 to measure the average data rate of each user over the preceding sampling period and to output this information to a comparator 40, which compares each user's average rate with their committed rate and, if appropriate, with their peak rate, and moves users between the subgroups accordingly.

Effects of the control procedure of the embodiment include the following.

If many users are seeking bandwidth at the same time, then a new user seeking bandwidth will join the end of the queue in subclass A, be allocated a number of cells to transmit, and will await its turn within the round robin scheduling to send those cells. This may be within a first service interval or it may be in a later service interval, depending on the length of the queue in subclass A.

If the user requests a channel requiring a small average bandwidth over a number of service intervals, so that the channel bandwidth is less than the user's committed rate, then the user will remain in subclass A and always be allocated bandwidth with high priority. An example of such a channel might be a voice channel.

As well as accommodating a continuous, or long term, channel bandwidth less than a user's committed rate, the embodiment also advantageously allows a user to transmit data burstily, for example by sending a large amount of data in a particular service interval or even a series of several service intervals, possibly subject to a maximum amount of data in each service interval. As long as a user's average data rate over a sampling period does not exceed its committed rate, such a user may remain in subclass A and obtain high priority service, even though the user's average rate over a period shorter than the sampling interval may exceed the committed rate. Thus, if a user in subclass A seeks to send a large amount of data, it will be allocated that amount of data to be sent when the scheduler provides bandwidth to it. The amount of data may even exceed the bandwidth in a service interval, in which case the user may remain queued to receive the remaining requested bandwidth in a subsequent service interval or intervals. A user requesting large amounts of bandwidth could block other users' access to bandwidth in this way except that when the user exceeds its committed rate it will be moved to subclass B and lose its high priority access to bandwidth until its average data transmission rate falls below its committed rate again.

After a user has exceeded its committed rate, then it will be moved to subclass B and will only receive further bandwidth with low priority, after all users in subclass A have been given bandwidth (up to their own committed rates).

If a user in subclass B reduces its use of bandwidth to a level below its committed rate over a sampling period, it will be moved back to subgroup A and enjoy higher priority access to bandwidth as long as it remains below its committed rate.

These steps ensure that each user can obtain high priority access to its committed bandwidth, but also that a user may use a bandwidth greater than its committed rate, up to its peak rate, at times when this bandwidth is available without inconveniencing other users; if a user has exceeded its committed rate, it can only transmit further data after all other users have been serviced up to their own committed rates. Thus, when few users are seeking to send data, transmitting users may advantageously achieve high data rates, and when the system is busy, the system controller endeavours to provide each transmitting user with their committed data rate before allowing any user to exceed their committed data rate.

As will be appreciated, it would be possible to envisage a situation in which so many users are seeking to transmit data that it is not possible to satisfy all of their committed data rates. This sets a limit to the aggregate amount of committed data rate which the system operator can sell to users (limiting either or both of the number of users or the committed data rates sold to each user). It would normally be reasonable for the operator to sell an aggregate amount of committed data rate greater than the total data capacity of the system, on the basis that not all users are likely to request bandwidth at the same time. However, when a user buys a committed data rate, they would expect to receive that data rate. The aggregate amount of bandwidth which can be sold is therefore limited by the risk of failing to satisfy users.

In the embodiment described above, the committed rate and peak rate for each user are fixed. In an alternative embodiment of the invention, however, either or both of these rates may be varied depending on the prevailing level of utilisation of the system, and the peak rate may be disregarded completely. For example, where peak rates are controlled by the system controller, it may be advantageous to increase the peak rates of users seeking to send data when few users are accessing the system. If very few users are accessing the system, the peak rates of those that are might even be temporarily disregarded. This would ensure that the active users can make effective use of the available bandwidth without having to contend for further bandwidth when they have exceeded their normal peak rates. Alternatively, if users in subclass B are allocated bandwidth only up to a predetermined maximum in each service interval, no peak rate measurement may be required at all as the allocation of a maximum bandwidth would achieve the objective of preventing one user from blocking other users' access in subclass B.

Figure 4:
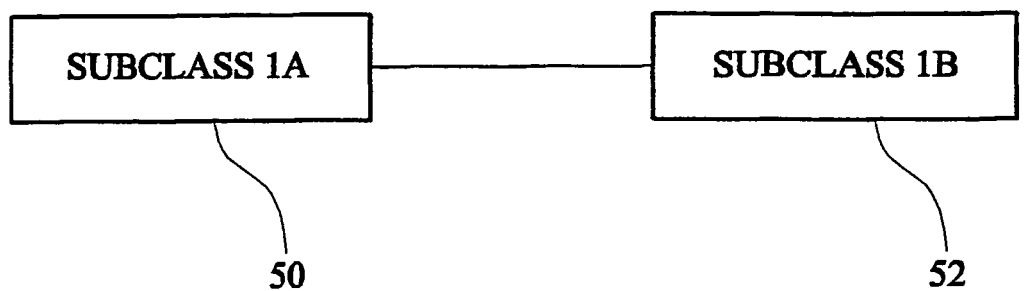
FIG. 4 is a block diagram showing the class and subclass structure of the second embodiment.
Figure 4:
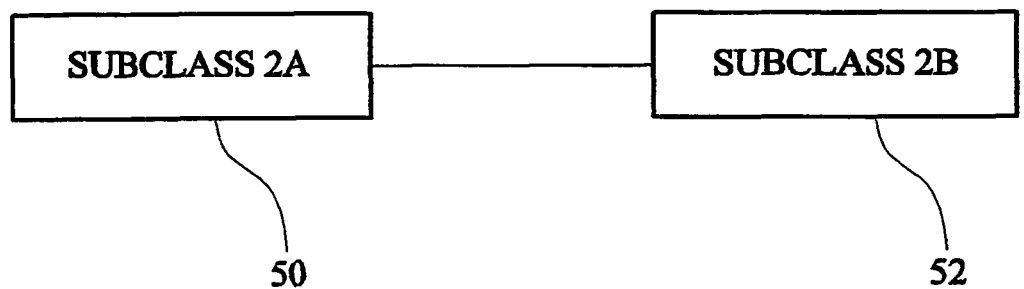

In a second embodiment of the invention, also implemented in a framed FWA system, two priority classes are provided as shown in FIG. 4. Each of the two classes, class 1 and class 2, contains two subclasses 50, 52. These are is termed subclasses 1A and 1B in priority class 1 and subclasses 2A and 2B in priority class 2.

Figure 5A:
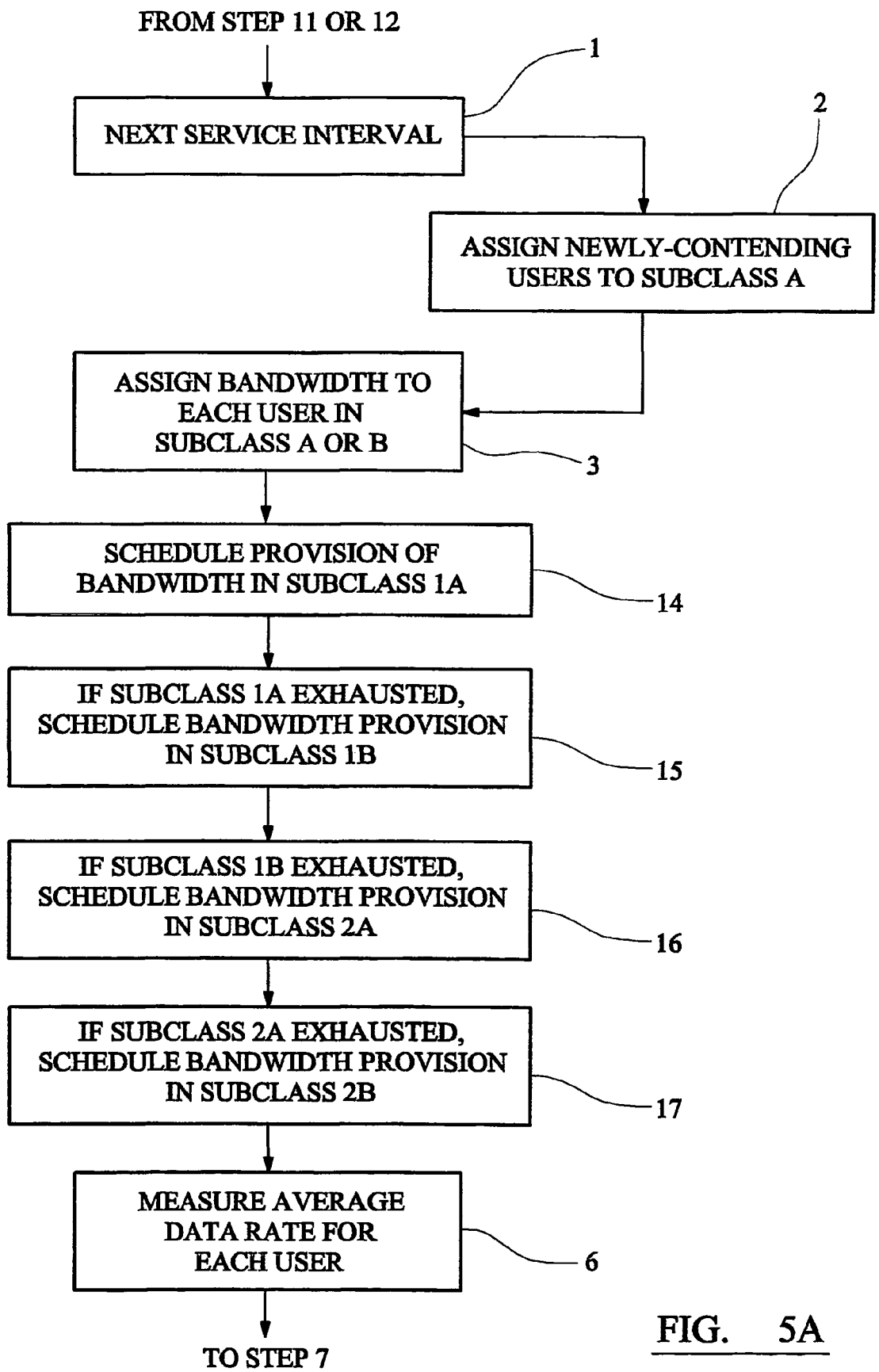
FIG. 5 is a flow diagram illustrating the method of the second embodiment.
Figure 5B:
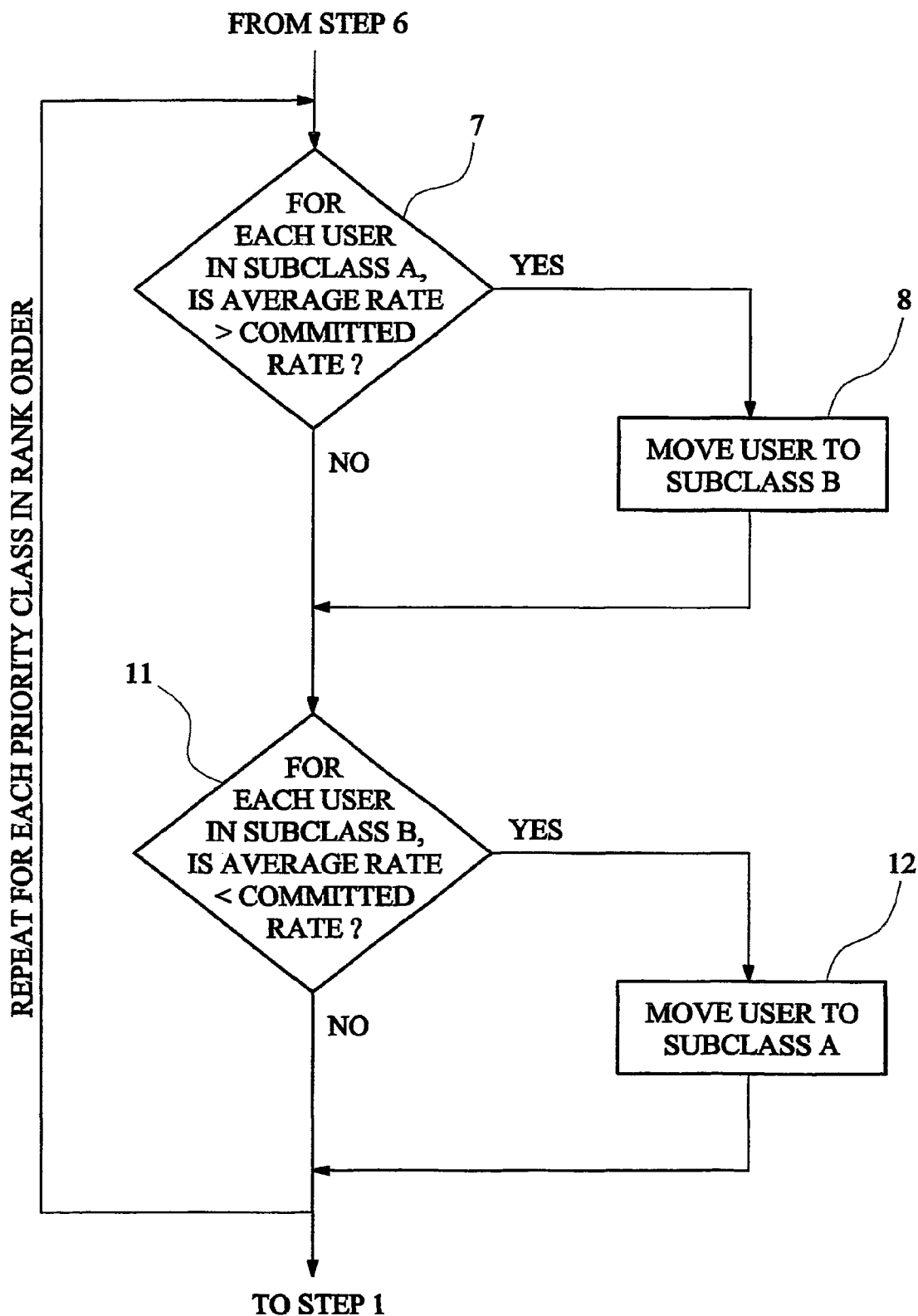

The operation of the second embodiment is illustrated in the flow chart of FIG. 5, in which steps common to FIGS. 1 and 5 carry the same reference numbers and will not be described here in detail. Within each class, the provision of bandwidth to users is handled in the same way as in the single class of the first embodiment. However, all transmissions from users in class 1 take priority over all transmissions from users in class 2. Thus, the scheduling steps in the method, which were steps 4 and 5 in FIG. 1, are carried out as follows.

First, in step 14 in FIG. 5, a round robin scheduler provides to users in subclass 1A the amounts of bandwidth allocated to them, until either the subclass or the total bandwidth of the service interval is exhausted. In step 15, if bandwidth is still available in the service interval, the scheduler provides bandwidth to users in subclass 1B, again until either the subclass or the total bandwidth of the service interval is exhausted. In subsequent steps 16 and 17 the scheduler provides bandwidth to users in subclass 2A and then to users in subclass 2B, stopping the provision of bandwidth at any point if the total bandwidth of the service interval is reached. As in the first embodiment, the steps of measuring each user's average data rate and moving users between subclasses as appropriate after comparison of each user's average and committed data rates are carried out before the strict priority scheduling is repeated in the next service interval.

As in the first embodiment, peak data rates are used to cap user's bandwidth access. As described above, capping may be applied passively, upstream of the system controller, or actively, controlled by the system controller.

The system controller for the second embodiment is the same as that for the first embodiment, as illustrated in FIG. 3, except that the functionality of the scheduler is as described above in relation to FIG. 5.

In the second embodiment, the two priority classes add flexibility to the operation of the system, which may be exploited as desired by the system operator. In a preferred embodiment, however, voice channels may be assigned to priority class 1 and data channels to priority class 2. Voice channels are usually of relatively low bandwidth but must be assigned high priority because they need to be continuously open for significant periods of time. Handling voice channels in class 1 ensures that they are always given priority over data channels, which are typically less sensitive to delays or interruptions in transmission.

When bandwidth is provided in order of priority to users in four subclasses, it is easy to conceive of a situation in which users in low priority subclasses would have to wait for an unacceptably long time for access to bandwidth, or could even be prevented from obtaining bandwidth by higher priority users. In practice, however, this is advantageously avoided by the operator selling only limited committed and peak data rates to users in the high priority class. For example, an operator might only permit each user to purchase a committed rate, or even a peak rate, allowing transmission of one voice channel in class 1, but to purchase larger committed and peak rates in class 2. In a typical service interval, subclass 1A might then contain 50 users seeking voice channels, which are provided with high priority before any other bandwidth is provided for other purposes. This ensures continuity of each voice channel. After the voice channels have been provided, the remainder of the bandwidth in the service interval is provided to users seeking to transmit data, for example, in accordance with the priority system described above.

The invention claimed is:

1. A method for providing bandwidth to users in a multi-user communications system, in which each user has a predetermined committed data rate, and in which bandwidth is provided to users in successive service intervals, each comprising a predetermined quantity of bandwidth for user transmissions, comprising the following steps in each service interval:
   providing to each user in turn the bandwidth requested by that user according to a scheduling procedure in which bandwidth is provided to users in a high priority subclass before users in a low priority subclass, the provision of bandwidth ceasing either when the bandwidth in the service interval is exhausted or when all of the requested bandwidth has been provided to users;
   measuring the average transmitted data rate achieved by each user over a sampling period, the sampling period being longer than the service interval;
   if the average data rate of a user in the high priority subclass exceeds their committed data rate, moving that user to the low priority subclass;
   if the average data rate of a user in the low priority subclass is lower than their committed data rate, moving that user to the high priority subclass; and
   assigning all users newly seeking bandwidth to the high priority subclass.

2. A method according to claim 1, in which each user has a predetermined peak data rate.

3. A method according to claim 1, in which the sampling period is much longer than the service interval such as more than 10 times as long as the service interval.

4. A method according to claim 1, in which the committed data rate and, where implemented, the peak data rate, are predetermined by agreement with a system operator.

5. A method according to claim 1, in which the users are classified into more than one priority class, each class containing two priority subclasses, and the step of providing bandwidth to users according to a scheduling procedure during each service interval includes the step of providing bandwidth to users in a high priority class before users in each lower priority class.

6. A method according to claim 5, in which users transmitting voice data are placed in a higher priority class than users transmitting other types of data.

7. A method according to claim 1, in which the communications system is an asynchronous transfer mode (ATM) system and each user comprises a virtual ATM circuit.

8. A method according to claim 1, in which a subscriber to the communications system represents a plurality of users, each having a committed data rate.

9. A method for allocating bandwidth to users in a multi-user communications system, in which each user has a predetermined committed data rate, in which bandwidth is provided to users in successive service intervals each comprising a predetermined quantity of bandwidth for user transmissions, and in which each user is classified into one of two or more ranked priority classes, comprising the following steps in each service interval for each priority class in turn, from the highest priority class to the lowest priority class:
   providing bandwidth requested by each user to each user in turn according to a scheduling procedure in which bandwidth is provided to users in a high priority subclass before users in a low priority subclass, the provision of bandwidth ceasing if the bandwidth in the service interval is exhausted;
   measuring the average transmitted data rate achieved by each user over a sampling period, the sampling period being longer than the service interval;
   if the average data rate of a user in the high priority subclass exceeds their committed data rate, moving that user to the low priority subclass;
   if the average data rate of a user in the low priority subclass is lower than their committed data rate, moving that user to the high priority subclass; and
   assigning all users newly seeking bandwidth to the high priority subclass.

10. A controller for allocating bandwidth in a multi-user communications system, in which each user has a predetermined committed data rate, and in which bandwidth is provided to users in successive service intervals each comprising a predetermined quantity of bandwidth for user transmissions, comprising:
   a memory for storing the committed data rate for each user;
   a scheduler for providing the bandwidth requested by each user to each user in turn according to a scheduling procedure in which bandwidth is provided to users in a high priority subclass before users in a low priority subclass, the provision of bandwidth ceasing either when the bandwidth in the service interval is exhausted or when all of the requested bandwidth has been provided to users;
   a data rate monitor coupled to the scheduler to receive information as to the bandwidth provided to users, for measuring the average transmitted data rate achieved by each user over a sampling period, the sampling period being longer than the service interval;
   a comparator coupled to the data rate monitor and the memory for comparing the average and committed data rates for users and, if the average data rate of a user in the high priority subclass exceeds their committed data rate, moving that user to the low priority subclass, and if the average data rate of a user in the low priority subclass is lower than their committed data rate, moving that user to the high priority subclass; and a contention processor coupled to the scheduler for assigning all users newly seeking bandwidth to the high priority subclass.

11. A controller according to claim 10, comprising a classifier coupled to the contention processor for classifying users into more than one priority class, each class containing two priority subclasses, and in which the scheduler, the data rate monitor and the comparator handle users in each class independently, bandwidth being provided to users in a high priority class before users in each lower priority class.

12. A controller according to claim 11, in which the classifier classifies users transmitting voice data in a higher priority class than users transmitting other types of data.

13. A controller according to claim 10, in which the communications system is an asynchronous transfer mode (ATM) system and each user comprises a virtual ATM circuit.

14. A controller for allocating bandwidth in a multi-user communications system, in which each user has a predetermined committed data rate, and in which bandwidth is provided to users in successive service intervals each comprising a predetermined quantity of bandwidth for user transmissions, comprising:

a memory for storing the committed data rate for each user;

a contention processor for handling requests for bandwidth from users;

a classifier coupled to the contention processor for classifying users into more than one ranked priority class, each class containing two priority subclasses, and assigning all users newly seeking bandwidth to the high priority subclass;

a scheduler coupled to the contention processor for providing the bandwidth requested by each user to each user in turn according to a scheduling procedure in which bandwidth is provided to users in the order of ranking of the priority classes, and within each priority class to users in a high priority subclass before users in a low priority subclass, the provision of bandwidth ceasing either when the bandwidth in the service interval is exhausted or when all of the requested bandwidth has been provided to users;

a data rate monitor coupled to the scheduler to receive information as to the bandwidth provided to users, for measuring the average transmitted data rate achieved by each user over a sampling period, the sampling period being longer than the service interval; and a comparator coupled to the data rate monitor and the memory for comparing the average and committed data rates for users and, if the average data rate of a user in a high priority subclass exceeds their committed data rate, moving that user to the low priority subclass in the same priority class, and if the average data rate of a user in a low priority subclass is lower than their committed data rate, moving that user to the high priority subclass in the same priority class.

15. A communications system for providing bandwidth to users in a multi-user communications system, in which each user has a predetermined committed data rate, and in which bandwidth is provided to users in successive service intervals, each comprising a predetermined quantity of bandwidth for user transmissions, the communications system performing operations in each service interval, the communications system comprising:

means for providing to each user in turn the bandwidth requested by that user according to a scheduling procedure in which bandwidth is provided to users in a high priority subclass before users in a low priority subclass, the provision of bandwidth ceasing either when the bandwidth in the service interval is exhausted or when all of the requested bandwidth has been provided to users;

means for measuring the average transmitted data rate achieved by each user over a sampling period, the sampling period being longer than the service interval;

means for moving a first user to the low priority subclass, if the average data rate of the first user in the high priority subclass exceeds the first user's committed data rate;

means for moving a second user to the high priority subclass, if the average data rate of the second user in the low priority subclass is lower than the second user's committed data rate; and means for assigning all users newly seeking bandwidth to the high priority subclass.

16. A communications system comprising:

a controller for allocating bandwidth in a multi-user communications system, in which each user has a predetermined committed data rate, and in which bandwidth is provided to users in successive service intervals each comprising a predetermined quantity of bandwidth for user transmissions, wherein the controller comprises:

a memory for storing the committed data rate for each user;

a scheduler for providing the bandwidth requested by each user to each user in turn according to a scheduling procedure in which bandwidth is provided to users in a high priority subclass before users in a low priority subclass, the provision of bandwidth ceasing either when the bandwidth in the service interval is exhausted or when all of the requested bandwidth has been provided to users;

a data rate monitor coupled to the scheduler to receive information as to the bandwidth provided to users, for measuring the average transmitted data rate achieved by each user over a sampling period, the sampling period being longer than the service interval;

a comparator coupled to the data rate monitor and the memory for comparing the average and committed data rates for users and, if the average data rate of a user in the high priority subclass exceeds their committed data rate, moving that user to the low priority subclass, and if the average data rate of a user in the low priority subclass is lower than their committed data rate, moving that user to the high priority subclass; and a contention processor coupled to the scheduler for assigning all users newly seeking bandwidth to the high priority subclass.

* * * * *

UNITED STATES PATENT AND TRADEMARK OFFICE
CERTIFICATE OF CORRECTION

PATENT NO. : 7,430,209 B2  Page 1 of 1
APPLICATION NO. : 10/481847
DATED : September 30, 2008
INVENTOR(S) : John David Porter It is certified that error appears in the above-identified patent and that said Letters Patent is hereby corrected as shown below:

Issued Patent:
Title Page, Column 2 (Abstract), Line 13.
Delete "inforamtion" and replace with --information--

Title Page, Column 2 (Abstract), Line 13.
Delete "in to" and replace with --into--

Signed and Sealed this

Nineteenth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,430,209 B2
APPLICATION NO.   : 10/481847
DATED             : September 30, 2008
INVENTOR(S)       : John David Porter Page 1 of 1

It is certified that error appears in the above-identified patent and that said Letters Patent is hereby corrected as shown below:

Title Page Item (73), change assignee name to: Cambridge Broadband Networks Limited Signed and Sealed this
Thirty-first Day of May, 2011

David J. Kappos
*Director of the United States Patent and Trademark Office*